Sept. 25, 1956 　　　　A. M. POREM 　　　　2,764,198
NUT HUSKING MACHINE HAVING SMALL
DIAMETER OPPOSED CUTTER DISCS
Filed Nov. 14, 1951 　　　　　　　　　　　5 Sheets-Sheet 1

Inventor
Antonio Manuel Porem
by Sommers & Young
Attorneys

United States Patent Office 2,764,198
Patented Sept. 25, 1956

2,764,198

NUT HUSKING MACHINE HAVING SMALL DIAMETER OPPOSED CUTTER DISCS

Antonio Manuel Porem, Lorenco Marques, East Africa, assignor to P. Santos Gil & Cia Limitada, Lorenco Marques, East Africa Application November 14, 1951, Serial No. 256,184

Claims priority, application Great Britain November 14, 1950

11 Claims. (Cl. 146—10)

This invention concerns improvements relating to nut-husking machines and is particularly concerned with machines for husking nuts such as cashew nuts. Cashew nuts present particular difficulties on account of their shape and structure. They are of irregular shape and size, but are in general of so-called kidney shape, having a concavity on one side and being convex on the other. The nuts are longer than they are wide and somewhat flattened on the flanks. The kernel is enclosed by a fine pellicle similar to that of a ground nut. Outside this, there is a dark brown husk which consists of outer and inner hard shells separated by a cellular layer.

The invention is particularly concerned with improvements in or modifications of the nut-husking machine set forth in the specification of United Kingdom Patent No. 610,059. A general object of such improvements is to enhance the efficiency and extend the mechanisation of the machine, whilst simplifying its construction in some respects.

One specific object of the improvements is to provide an improved arrangement for cutting the husks of the nuts. Another object is to provide means for ensuring that the kernel of the nut is not retained within one of the half-husks into which the husk has been cut.

A further specific object is to provide an effective mechanical feeding arrangement whereby nuts, especially nuts of the peculiar shape of raw cashew nuts, can be properly fed one by one to the main part of the machine in synchronisation with the operation of the latter.

In accordance with the invention, the nuts are carried by conveyor means having nut-holding devices past a husk-cutting arrangement which consists of a series of co-acting opposed cutter discs of small diameter following closely on each other and which comprises successive such cutter discs arranged to rotate in opposite directions and/or cutter discs arranged to reverse their direction of rotation during the cutting of each husk.

According to another aspect of the invention, in a nut husking machine wherein the nuts are carried by conveyor means having nut-holding devices past a husk-cutting arrangement which divides each husk into two halves, husk-breaking means are provided which are adapted by co-operation with the conveyor means for breaking one of the half-husks thus produced (the half-husk on the concave side of the cashew nut).

The cutter discs may be toothed, one profile of the teeth being designed for driving purposes and the other for cutting purposes. There may be two sets of cutter discs, the second set of cutter discs being provided with teeth having thinner cutting tips located centrally of thicker root portions which enter the incisions made by the first set of cutter discs whilst the tips make a fine further cut. The driving mechanism for the said second set of cutter discs may include means for reversing the direction of rotation of these cutter discs as each nut-holding device passes and again as the intermediate point between it and the next such device passes.

The cutting arrangement may be followed by husk-opening means engageable with the cuts produced by the cutter discs and comprising opening blades pivotally mounted upon pivotally supported arms, the said blades and arms being spring loaded towards the husk-engaging position.

Husk-breaking means following the said opening means preferably comprises a three-toothed fork arranged in the path of conveyance of the nuts so that the centre tooth will enter the cut produced in each nut by the cutter discs and one of the side teeth will engage the longer half of the nut (the concave half of the cashew nut) and press it towards the rear part of the nut holding device, particularly towards the wings of the trailing clip of the nut holder in which the said nut half lies. The fork is pivotally mounted upon a member slidable in the prolongation of the direction of conveyance of the nuts, cam means associated with the said fork permitting it initially to yield in the said direction only but thereafter to rock to the one or the other side under the eccentric force produced by the engagement of the one side tooth with the longer half of the nut. The breaking means further comprises blade-like members adapted for being moved automatically into the path of a husk half engaged between a side tooth of the fork and the rear part of a nut-holding device, whereby the said husk half will be broken across one of the said members as it continues to be advanced by the said device.

An arrangement for feeding nuts to the conveyor means may comprise a receptacle from the bottom of which nuts are released singly through a throat formed between adjacent parts of the concave rims of two rotating wheels. In a machine for husking cashew nuts in which nut-holding devices are adapted for gripping the nuts with their length extending in the direction of conveyance and with their flanks presented towards the cutting means, the nuts may be released from the receptacle with their length extending vertically through an oval throat substantially corresponding to the cross-sectional shape of the nuts, guiding means being provided for receiving the nuts from the said throat and presenting them for being gripped in the aforesaid position by respective nut-holding devices. An escapement device for controlling the release of the nuts may consist of two stops arranged to be projected in alternation across an extension of the said throat at points separated by a distance rather greater than the length of a nut.

Preferably, nut holders co-acting to form the nut-holding devices are carried past the husk-cutting arrangement by the parallel operative flights of endless conveyor chains, each of the said chains being backed in the said operative flight by a single spring-loaded backing member provided with a single presser member engageable by the passing holders. The backing members may be connected together through a balancing means serving to equalise the backing pressures.

Each nut holder may comprise a concave body part connected to a conveyor chain and leading and trailing clips pivotally connected to the body part or chain and adapted for gripping the ends of a nut whose sides are engaged by the body parts of co-acting holders. The leading clip may be provided with a small tail engageable with the sprocket wheel around which the chain passes at the entry end of its operative flight. The trailing clip may be formed with upstanding stop means engageable with the end of a respective half of the husk after the cutting thereof.

A preferred embodiment of the invention will now be more fully described by way of example and with reference to the accompanying drawings, in which:

Figure 1 is a plan view of a complete machine for husking cashew nuts,

Figure 2 a horizontal section through the main part of the machine at the level of the nut-conveyor chains thereof, Figure 3 a longitudinal central vertical section through the main part of the machine and part of the nut-feeding arrangement, various parts of the machine being omitted for the sake of clarity, Figure 4 an enlarged side elevation, partly in section, of the nut receptacle and other parts of the feeding arrangement, Figure 5 an elevational view to a larger scale, as seen from the left of Figure 4, of an escapement device forming a part of the feeding arrangement, Figure 6 an enlarged end elevation of a balancing linkage, Figure 7 a side elevation (as seen in the direction of arrow VII in Figure 2) of a nut holder to a larger scale, Figure 8 a section on the line VIII—VIII in Figure 7, Figure 9 an enlarged end elevation of the first set of husk cutters, Figure 10 an enlarged side elevation of a cutter disc thereof, Figures 11 and 12 an enlarged side and end elevations of a cutter disc of the second set of cutters, Figure 13 an end elevation to a larger scale and partly in section of driving mechanism for the second set of cutters, Figure 14 a plan view of a part of the said mechanism, Figure 15 an enlarged underneath plan view of part of the husk breaking means, and Figures 16 and 17 detail views, in side elevation and sectional plan, of another part thereof.

Figures 1, 16, 17:
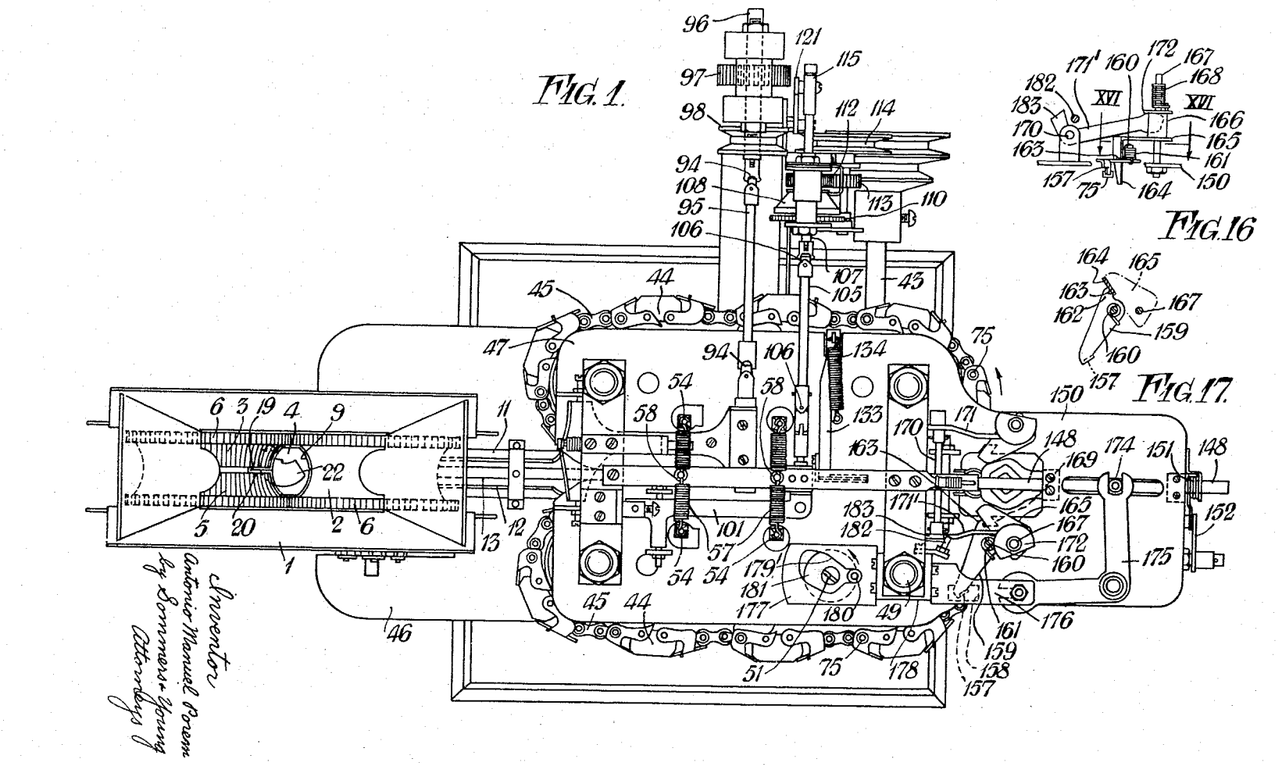
Figures 3, 10, 11, 12:
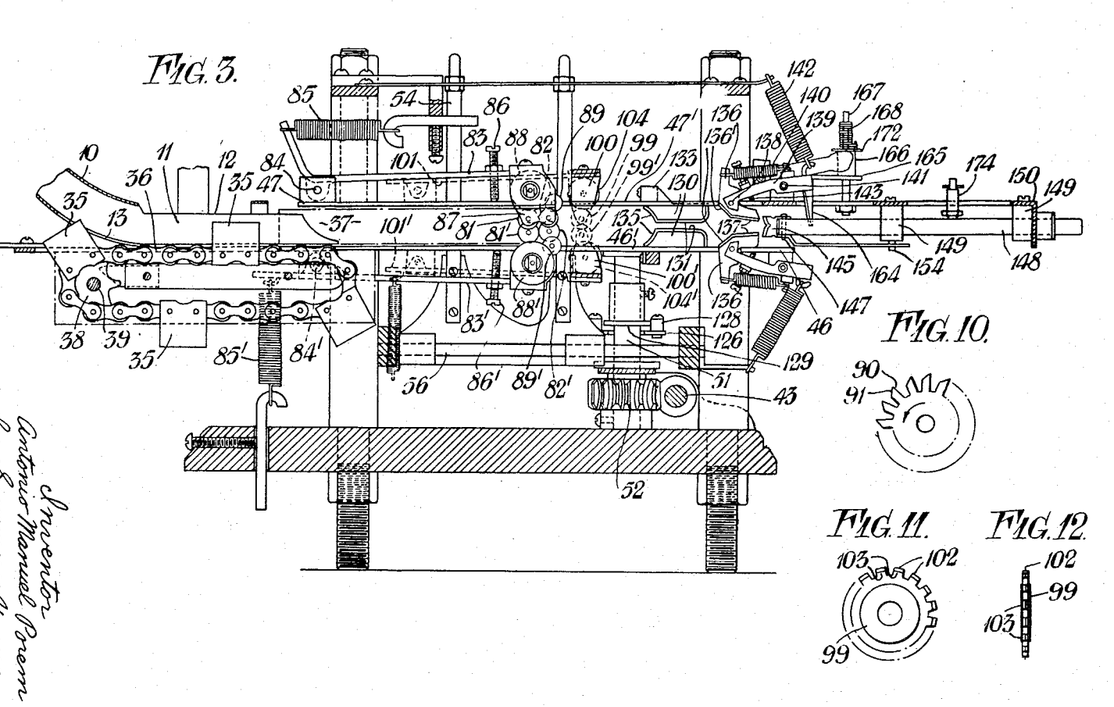
Figures 4, 5, 8, 9:
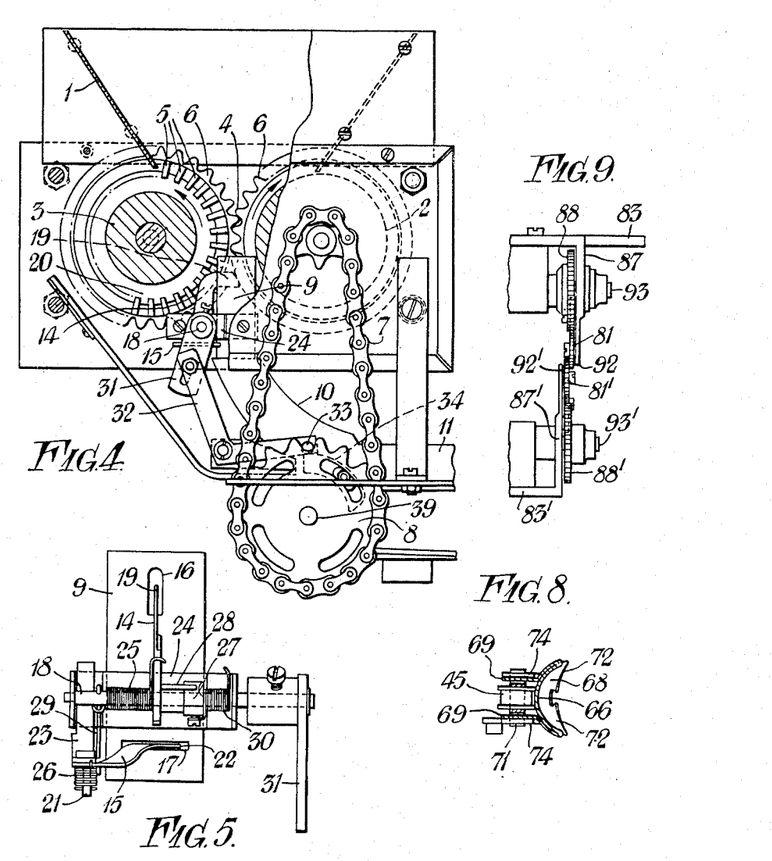

Referring first of all to Figures 1 and 4 of the drawings, the nut-feeding arrangement of the machine comprises a nut receptacle in the form of a downwardly tapering hopper 1 substantially closed at the bottom by adjacent upper quadrants of two wheels 2, 3 which are rotatable about parallel transverse axes. An oval throat 4 (Figure 1), through which nuts from the bottom of the hopper are released one by one as hereinafter explained, is formed between adjacent upwardly moving parts of the concave rims of the wheels 2, 3. Preferably one of these wheels (as shown, the wheel 2) is smooth, whereas the other is provided with transverse ribs 5 which assist in keeping the throat 4 clear of nuts which are not in position for falling through said throat in the required fashion, that is with their length directed vertically and their width transversely. The wheels 2, 3 are geared together by rings of teeth 6 on both sides, the wheel 2 being driven through a sprocket chain 7 from a sprocket wheel 8 (Figure 4). A vertical tube 9 of oval section similar to that of the throat 4 extends downwardly therefrom and opens into a chute tube 10 which runs with a smooth bend (Figures 3 and 4) into a horizontal nut guide 11 having an inspection aperture 12 along the top and a slot 13 along the bottom.

For the release of the nuts singly from the throat 4, an escapement device is provided (Figures 4 and 5) which consists of two stops 14, 15 arranged to be projected in alternation across the tube 9, through slots 16, 17 in the wall thereof, at points separated by a distance a little greater than the length of a nut. The upper stop 14 comprises an arm rockable about a horizontal spindle 18 and having a pointed finger 19 bent over to project across the tube 9 (Figure 4). The wheel 3 is provided with a circumferential groove 20 to permit the finger 19 to be retracted (Figure 1). The lower stop 15 comprises an arm rockable about a vertical pivot 21 and having a finger 22 for projecting across the tube 9 (Figure 1). The pivot 21 is supported by an L-shaped extension 23 of a bracket 24 which is attached to the tube 9 and itself supports the spindle 18. The stops 14 and 15 are urged towards their operative positions across the tube 9 by respective torsion springs 25, 26 (Figure 5) and are arranged to be retracted respectively by an abutment block 27 fast on the spindle 18 and engaging a pin 28 in the arm 14 and an abutment pin 29 fixed in the spindle 18 and engaging the arm 15. Upon rocking of the common spindle 18, the parts 27, 29 are arranged to retract the stops 14, 15 in alternation. The spindle is urged (anti-clockwise in Figure 4) towards the end position for retracting the upper stop 14 by a torsion spring 30 (Figure 5) acting on the part 27 and is periodically rocked to the opposite end position, for retracting the lower stop 15, through an arm 31, a cranked lever 32 carrying a follower pin 33, and an arcuate cam piece 34 secured in circumferentially adjustable manner on the sprocket wheel 8 (Figure 4).

Figure 2:
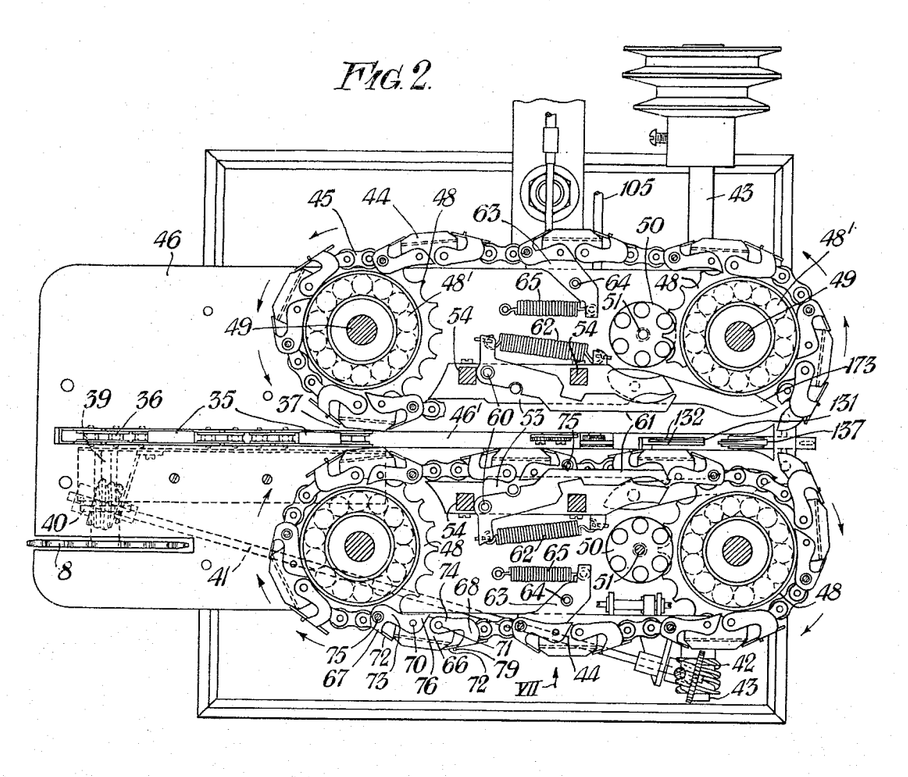

When a nut is released by the retraction of the lower stop 15, whilst a following nut is held up by the upper stop 14, it slides down the chute 10 and is engaged by one of a series of upstanding pushers 35 (Figure 3) on a sprocket chain 36 whose operative upper flight runs between the said tube 10 and the entry end 37 of the main part of the machine, the said pushers travelling along the slot 13 in the tube 12. A sprocket wheel 38 driving the chain 36 and the sprocket wheel 8 driving the hopper wheels 2, 3 are fast on a shaft 39 driven through worm gearing 40, a shaft 41 and worm gearing 42 from the main drive shaft 43 of the machine (Figure 2). By this means it can be arranged that each nut is released at the right time to be engaged by a pusher 35 and is then presented by the pusher at the entry end 37 of the machine proper, again at the right time. Due to the guidance offered from the throat 4 onwards, the nut is presented lengthwise and lying on one of its flanks.

At the said entry end 37, each nut is gripped by and between converging nut-holders 44 on main conveyor chains 45 whose parallel operative flights run between a platform 46 and a cover 47. These chains are arranged substantially as described in the aforesaid specification, although the chain-backing or tensioning means are simpler. The chains travel on edge in the direction of the arrows shown in Figure 2 around sprocket wheels 48 mounted by ball bearings 48¹ on vertical spindles 49. Two of the sprocket wheels 48 are rotated by pin wheels 50 carried by shafts 51 driven through worm gearing 52 (Figure 3) from the main drive shaft 43. For backing each chain in its operative flight, there is a single long plate 53 (Figure 2) which is carried by upstanding arms 54 pivotally mounted on a spindle 56 (Figure 3) and is pressed with its front edge against the back of the chain by tension springs 57 (Figures 1 and 6) acting between the tops of the arms 54 and fixed anchorages 58. The arms 54 on opposite sides are connected by a balancing linkage 59 (Figure 6) so that the backing pressures on the two chains are equalised. Pivotally mounted on each plate 53 at 60 (Figure 2) is a single presser device 61 which is spring-loaded by a tension spring 62 so as to co-act with leading clips of the nut holders 44 while the latter are passing the husk-cutting means, as hereinafter described. As the space occupied by the husk-cutting means to be described is comparatively short, the aforesaid simple arrangement affords an adequate backing to the chains and an ample pressing action for the nut holders. However, to assist in maintaining the chains 45 under tension, so that the backs of their parallel operative flights are held against the guiding edges of the plates 53, tensioning arms 63 mounted upon fixed pivots 64 and loaded by tension springs 65 are arranged to act upon the backs of the return flights of the said chains, as shown in Figure 2. This provision also avoids the danger of an empty nut holder 44 fouling other parts due to slackness of the chains 45.

Figure 7:
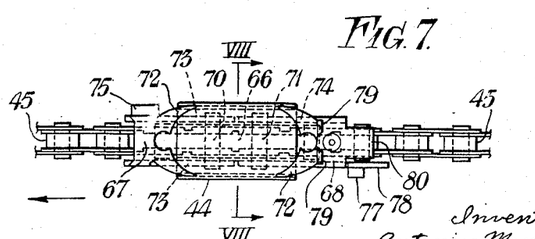

Each nut holder 44 comprises a body part 66, a leading clip 67 and a trailing clip 68. The body part 66, which is of channel section, has flanges 69 (Figure 8) by which it is mounted upon extended pivot pins 70, 71 of the chain 45. The clips 67 and 68 have wings 72, formed with smooth curved edges and extending towards each other over the concave body, and trailing and leading arms 73 and 74 respectively which embrace the body flanges 69 and are pivotally mounted upon the pins 70 and 71 respectively. In effect, therefore, the body part 66 tends to behave like a link of the chain, whereas the clips 67, 68 can pivot in relation to the body part to a limited extent. Each leading clip 67 has a single roller 75 (Figure 7) on its upper side for a purpose to be described and is also provided beyond the pivot pin 70 with a small tail 76 which engages the hubs of the sprocket wheels 48 (Figure 2), such engagement causing the clip to open slightly and also avoiding danger of its striking against the end of the tube 11. Each trailing clip 68 is provided with a roller 77 (Figure 7) on a tail portion 78 of its lower arm 74, with a pair of upstanding stops 79 and with another tail portion 80 behind its wings 72. The functions of these parts 77—80 will be hereinafter described.

As will be appreciated from Figure 2 in particular, each single nut delivered by a pusher 35 is presented at 37 between the two chains 45 as a co-acting pair of nut-holders 44 enters the operative flight and closes upon the said nut. The nut, still extending lengthwise and lying on one flank with its convex portion towards one holder 44 or the other, is engaged between the two body parts 66, of which one receives the convex portion of the nut and the other the two proud portions on the other, concave, side. While the holders are passing around the sprockets 48, the clips 67, 68 are open so that the nut can enter freely between the body parts 66. As the holders leave the sprockets and the adjacent chain parts straighten against the backs of the clips, first the leading clips 67 and then the trailing clips 68 are closed upon the nut and grip the same by means of the wings 72, a slightly greater closing movement being imparted to the clip 68 by reason of the presence of the tail 80. Thus the nut is finally held against longitudinal movement as well as gripped laterally. Thus secured, it is carried by the holders past a series of husk-cutting, opening and breaking means which operate upon the flanks of the nut from below and above through long slots 46¹, 47¹ in the platform 46 and cover 47.

A first set of cutters (Figures 3 and 9) comprises two pairs of initially overlapping upper and lower cutter discs 81, 81¹ and 82, 82¹ of small diameter, the two pairs following closely one on the other. The upper and lower discs are carried upon upper and lower arms 83, 83¹ pivotally mounted at 84, 84¹, and are urged towards each other by tension springs 85, 85¹, the initial overlapping positions being adjustable by means of screws, 86, 86¹. The pivots of the cutter discs are carried from the arms 83, 83¹ through brackets 87, 87¹ each of which also supports a driving pinion, 88 or 88¹, whose teeth mesh directly with the teeth of one disc, 81 or 81¹, and also with a similarly supported intermediate pinion, 89 or 89¹, which meshes directly with the other cutter disc, 82 or 82¹, respectively. For this purpose one profile 90 of the disc teeth is designed for driving purposes and the other profile has a sawtooth like obliquity 91, as shown in Figure 10. The upper cutter discs 81, 82 (as also the lower cutter discs 81¹, 82¹) thus rotate in opposite directions, that is the discs 81, 81¹ turn inwardly on the side towards approaching nuts and the discs 82, 82¹ inwardly on the side towards receding nuts. This manner of mounting and arranging the cutter discs gives a good cutting effect, particularly at the beginning of the cutting action, where the teeth of the discs 81, 81¹ enter deeply into the end of the husk, and also at the end of the said action and minimise clogging of the cutter teeth. The bracket parts 92, 92¹ (Figure 9), adjacent to the cutting discs are rounded co-axially therewith (see the bracket 87 in Figure 3) and by running on the outside of the husk limit the depth of cutting of the respective discs. The shafts 93, 93¹ of the pinions 88, 88¹ are connected by universal joints 94 and telescopic shafts 95 (Figure 1) to shafts 96 which are coupled together by gear wheels 97 and driven continuously from the main shaft 43 through a pulley 98 on one of the said shafts 96.

The second and closely following set of cutters, which complete the severing of the husk into two separate halves, comprises single upper and lower, initially overlapping cutter discs 99, 99¹ mounted in brackets 100, 100¹ which are rounded to run on the husk and are carried by spring-loaded arms 101, 101¹, the arrangement of all these parts being generally similar to that described for the first set of cutters. The saw teeth of the discs 99, 99¹ have short thin cutting tips 102 located centrally of thicker root portions 103 (Figures 11 and 12). This tip formation may be produced by cutting down the height and width of an original tooth form. The two tooth portions act simultaneously upon the husk, the root portion 103 entering the incision made by the first set of cutters and clearing the cut made thereby down to the hard brown pellicle which separates the kernel from the husk, whilst the tip portion 102 makes a very fine cut through the said pellicle. These cutter discs 99, 99¹ are also driven, similarly to the first cutters, through pinions 104, 104¹ and telescopic shafts 105 (Figure 1) with universal joints 106 from shafts 107, 107¹, but the further driving means includes an arrangement which reverses the direction of rotation of the discs 99, 99¹ as the centre of each co-acting pair of nut holders 44 passes them and again as an intermediate point between successive pairs passes the said discs, so that the said discs 99, 99¹ turn inwardly towards the approaching nut and then inwardly towards the receding nut. This motion reversal also ensures a better cutting effect at the beginning and end of the cutting action and minimises clogging of the teeth.

Figures 6, 13, 14, 15:
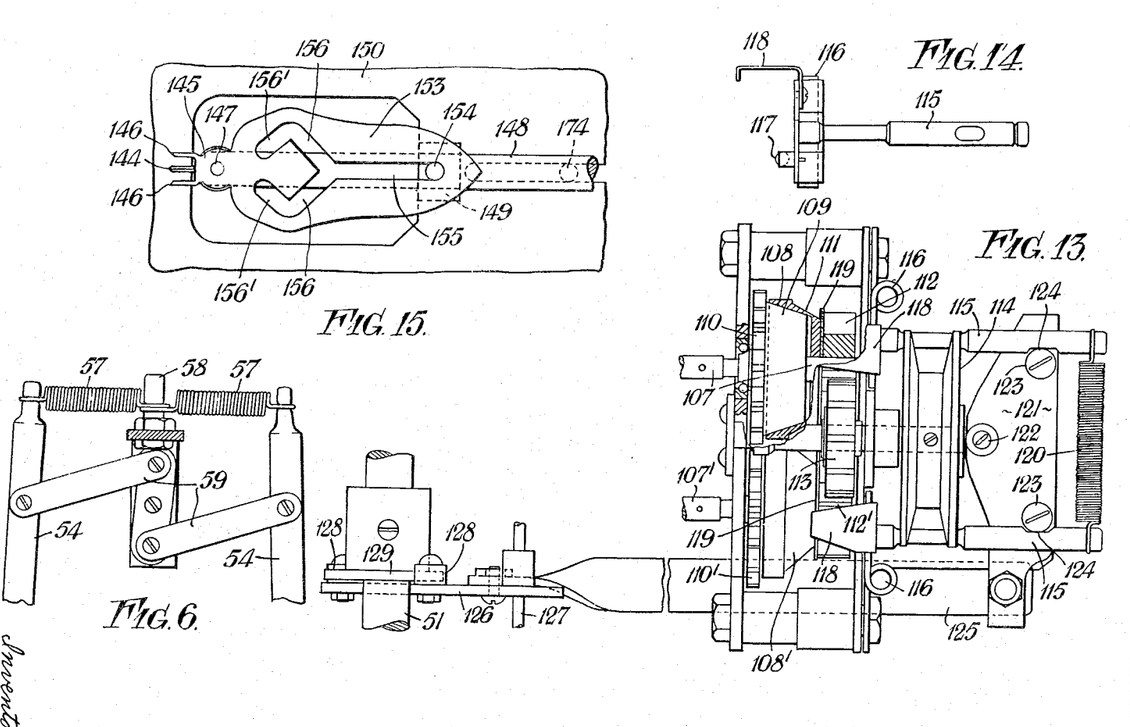

For producing this reversal, the shafts 107, 107¹ are arranged to be driven through two similar cone clutches 108, 108¹ (Figure 13) which are automatically engaged in alternation. The male parts 109 of the clutches are fast on their respective shafts 107, 107¹ and are connected to meshing gear wheels 110, 110¹ by which the said shafts, driving the discs 99, 99¹, are permanently coupled to rotate in opposite directions. The female parts 111 of the clutches, which are shiftable axially on respective shafts 107, 107¹ and are free thereon, are connected to gear wheels 112, 112¹ meshing with a gear wheel 113 by which they are constantly driven, in the same direction as each other, through a pulley 114 from the main drive shaft 43. For controlling the clutch parts 111 so that when one of the clutches 108, 108¹ is engaged the other is disengaged, each said part is acted upon by a rocker arm 115 which has a hinge-like mounting at 116 and carries a thrust ball 117 (Figure 14) for pressing the clutch part 111 into engagement and a hooked finger 118 for withdrawing it from engagement. The ball 117 and finger 118 act through a disc 119 which is secured between the clutch part 111 and its respective gear wheel 112 or 112¹. The arms 115 are loaded towards the clutch-engaging position by a common tension spring 120 and are displaced alternately to the disengaging position by a common oscillatory lever 121 pivotally mounted at 122 and having rollers 123 acting upon the arms. The arms have shallow recesses 124 into which the rollers 123 alternately enter (the respective clutch being then disengaged) and from which the said rollers alternately ride out at the left-hand end (Figure 13) to rock the respective arm 115 outwardly so as to cause engagement of its clutch. Figure 13 shows the arrangement in the momentary intermediate position in which both clutches 108 and 108¹ are disengaged. The requisite oscillatory motion of the lever 121 is derived through a link 125 and a forked rocker 126 which is mounted on a pivot 127 and carries rollers 128 (Figures 3 and 13) engaged alternately by the lobe of a cam disc 129 or may be actuated by an eccentric. The cam or eccentric is fast upon the shaft 51 of the nearest sprocket-chain pin wheel 50, so that the necessary synchronisation of the clutch-operation with the motion of the chains 45 and nut holders 44 is simply provided for.

During the action of the cutters upon the nut, the chains 45 are firmly backed by the plates 53 and the grip of the nut holders 44 on the nut is enhanced by the engagement (see the lower half of Figure 2) of the rollers 75 on the leading clips 67 with the edges of the respective pressers 61.

The second set of cutters is followed by co-acting upper and lower longitudinal guides 130 (Figure 3) having downwardly and upwardly presented blades 131 which enter the cuts and are backed by shoulders 132 (Figure 2) which ride over the husks. The guide 130 are carried upon transverse pivotally mounted arms 133 (Figures 1 and 3) loaded by springs 134, so that the guides can yield as their shoulders 132 ride over the husks. At the ends 135 (Figure 3) towards the cutters, the shouldered edges are so shaped as to engage around the entering nut. These guides assist in retaining the nuts in a properly centered position until the cuts in the husks are engaged by the ends of the following upper and lower husk openers 136.

The husk openers comprise shouldered blades 137 of wedge form in plan (Figure 2) and shaped, as at 136¹ (Figure 3), to engage around the entering nut. Each opener is pivotally mounted at 138 in the forked end of an arm 139 and is loaded towards the initial nut engaging position shown in Figure 3 by a tension spring 140 extending between anchorages on the said opener and arm. The arm 139 in turn is pivotally mounted at 141 and is loaded by a spring 142 towards the initial nut-engaging position shown in Figure 3, this position being adjustable by means of an adjustable stop 143. As a nut enters the gap between the openers 136, the blades 137 enter the incisions, the blades and arms 139 yielding as the blade shoulders ride over the husk. The wedge shape of the blades 137 causes the two halves of the husk to be forced apart just at the point, towards the exit end of the operative flights of the chains 45, where the co-acting nut holders 44 are commencing to separate. The double articulation, at 138 and 141, of the mounting for each opener 136 ensures good contact with the nut whatever its precise position in the nut holders.

At the extreme exit end of the operative flights of the chains 45, where the effect of the backing plates 53 and pressers 61 no longer prevails, the nut holders 44 co-operate with a husk-breaking arrangement whose purpose is to break the half husk on the concave side of the nut, taking advantage of the recessed husk formation on this side. The kernel is often retained in this part when the husk is opened by the openers 136, but if the said part is broken the kernel is freed. The concave side of any nut leaving the openers may, of course, happen to be on either side in the nut holders 44, but the fact that the half husk on the concave side is slightly longer than the other half permits of an arrangement which will effect the breaking irrespective of the side on which the concave part lies.

As a result of the reaction of the openers 136, the longer, concave husk half has tended to be pressed against the edges of the wings 72 of the trailing clip 68 of the nut holder 44 on that side, while the shorter convex half has not experienced the same tendency on the other side. As the nut emerges from the openers 136, the longer centre tooth 144 of a three-toothed fork 145 (Figures 3 and 15) arranged in the path of the nut is advanced slightly, as hereinafter described, and enters the cut, while the side teeth 146 are engageable with the husk. The concave husk half continues to be held against the trailing clip 68 by one tooth 146, whereas the shorter convex half becomes free to fall away when released by the opening of the nut holder 44 on that side. The fork 145 is mounted on a vertical pivot 147 carried by a long rod 148 which is slidable horizontally, in guides 149 carried by an extension 150 of the cover 47, in the line of prolongation of the nut movement, a constant resistance being offered to such sliding movement by the frictional grip of a torsion spring 151 (Figure 1) coiled around the rod 148 and adjustably stressed by means of an adjustable abutment 152. An extension 153 (Figures 3 and 15), in the form of a horizontal plate, of the fork contains a cam slot which is engaged by a fixed pin 154 carried by one of the guides 149. A central axial cam-slot portion 155, in which the pin 154 normally lies, forks into two divergent V-shaped portions 156. The one-sided engagement of the one fork tooth 146 with the concave husk half exerts a turning moment on the fork 145 as well as a thrust. Initially the fork remains square and yields axially to the thrust together with the rod 148, as the engagement of the pin 154 in the axial slot portion 155 prevents any turning movement of the fork. However, when the division in the slot reaches the pin 154, so that it can enter either of the divergent slot portions 156, the turning moment is permitted to cause the plate 153 to swing in the one or the other direction depending upon the position of the concave half husk.

As the nut continues to be advanced by the holders 44 moving around the sprockets 48, the stops 79 on the trailing clip 68 of the holder containing the concave husk half come to bear against the cut edge at the adjacent end of the husk half and thereafter hold the said half up to the fork tooth 146. In the final yielding movement of the fork and the rod 148, a convergent part 156¹ of the slot allows of automatic adaptation of the position of the fork tooth 146 in relation to the clip stops 79 to suit any length of half husk.

Meanwhile, the roller 75 on the leading clip 67 of one of the co-acting nut holders has come into contact with a finger 157 (Figure 1) projecting downwardly, through an opening 158 in the cover extension 150, from a horizontal arm 159 mounted on a pivot 160 and loaded towards the position shown in Figure 1 by a torsion spring 161. A tail portion 162 of the said arm engages under a stop peg 163 (Figures 16 and 17) on a blade 164 projecting downwardly from an arm 165 which is carried by a sleeve 166. This sleeve is slidably mounted upon a fixed post 167 and is urged downwardly thereon by a compression spring 168. Normally, however, it is retained in the upper position shown in Figure 3 by the contact of the stop 163 with the tail 162 aforesaid. The blade 164 projects through a slot 169 in the cover extension 150. The blade arrangement 164—169 is duplicated on the other side of the machine and the two blade arrangements are coupled through a rock shaft 170 with arms 171, 171¹ engaging collars 172 on the sleeves 166. The two blade arrangements are constrained thus to move up and down together.

Upon contact of a roller 75 with the finger 157, the arm 159 is rocked anti-clockwise (in Figure 1), so that the support of the tail 162 is withdrawn from the stop peg 163. The blades 164 are therefore pressed down by the springs 168 until the front edge of one or other of them engages in the concavity of the approaching half husk still held between the clip stops 79 and the fork tooth 146. As the concavity does not always occupy a symmetrical position in the half husk, some lateral play is allowed to the blades 164 by the width of the slots 169, the springs 168 being arranged to exert a torsion effect as well as compression so as to urge the blades towards the left-hand sides of the slots (in Figure 1). Also, as the depth of the concavity may vary from nut to nut, the front operative edge of each blade 164 is sloped back towards the lower end (see Figure 3).

As the half-husk, still engaged by the fork tooth 146, continues to be advanced by the stops 79, it is forced hard against the blade 164 and is thereby caused to bend about this blade until it breaks. Up to this point, the trailing clips 68 have been held in the closed or husk-holding position by the engagement with their rollers 77 of fixed guides 173 (Figure 2) on the platform 46.

The rollers 77 now leave the ends of the guides 173 and the quarter husk held by the one trailing clip, as well as the unbroken husk half, are fully released. At the same time, the other quarter husk is also released by a slight retraction imparted to the rod 148 carrying the fork 145. This retraction is imparted through an upstanding post 174, a bell-crank lever 175 (Figure 1) and a lever comprising arms 176, 177 fixed to a hub part 178 pivotally mounted on one of the pillars 49. The arm 177 is formed with an internal cam edge 179 engaged by a crank pin 180 on a disc 181 fast on the upper end of the adjacent sprocket shaft 51. The cam is designed so that, starting from the position illustrated in Figure 1, the rod 148 is first caused to advance the fork 145 slightly to the husk-engaging position, as described above. Then, while the fork 145 is thereafter being forced back by the husk-half engaged, the rod 148 is free of cam-control as the pin 180 is freely traversing the trough 179¹. Thereafter the rod is retracted slightly after the husk-breaking operation, as just mentioned, and is finally allowed to return to the initial position shown in Figure 1.

At the same time as the rod 148 is retracted, a finger 182 on the hub part 178 engages an upstanding arm 183 on the arm 171¹ and thus lifts the arms 171, 171¹ and, through them, the sleeves 166 and blades 164 back to their original raised positions where they are held by the re-engagement of the tail 162 of the arm 159 under the blade stop 163.

By the above-described action, the kernel of the nut has, of course, also been freed. Its retention in the concave husk-half is precluded by the breaking of this half, as described above.

I claim:

1. A nut-husking machine comprising in combination conveyor means, nut-engaging devices mounted on said conveyor means and a husk-cutting arrangement past which the nut-engaging devices are carried by the conveyor means, said husk-cutting arrangement comprising co-acting rotary cutter discs arranged on opposite sides of the path of a nut and driving means for transmitting a drive in one direction of rotation to cutter discs engaging an approaching nut, namely so that the said discs turn inwardly on the side towards the said approaching nut, and in the opposite direction to cutter discs engaging a receding nut, namely so that the said discs turn inwardly on the side towards the said receding nut.

2. Machine according to claim 1, wherein cutter discs are provided with teeth whose one profile is a plain driving profile in engagement with the driving means and whose other profile is a saw-tooth cutting profile.

3. Machine according to claim 1, wherein there are two sets of co-acting rotary cutter discs and the second of said sets of discs have teeth with thin cutting tips and thicker root portions on which said tips are located centrally, said root portions being operative to enter incisions made by the first of said sets of cutter discs and said tips being operative to make a fine further cut.

4. Machine according to claim 1, wherein the disc-driving means comprises a pair of clutch devices each engageable for transmitting a drive in one direction, a reversing device by which said clutch devices are engaged alternately and means operatively associated with the conveyor means and adapted for actuating said reversing device as each nut-holding device passes the discs and again as the intermediate point between it and the next such device passes, namely so that the said discs always turn inwardly towards a nut entering between them and inwardly towards a nut passing from between them.

5. A nut-husking machine comprising in combination conveyor means, nut-holding devices mounted on said conveyor means, and husk-cutting discs and husk-breaking means past which the nut-holding devices are carried by the conveyor means, the husk-breaking means comprising breaking blades mounted in the path of conveyance of the nuts and a three-pronged fork mounted in advance of the said blades in the path of conveyance of the nuts and positioned in relation to the conveyor means so that the center prong of said fork will enter the cut produced in each husk by the cutting discs and one of the side prongs will engage one half of the husk and press it towards the rear part of the respective nut-holding device, whereby the said husk half is held and presented for being broken across one of the said blades, a member slidable in the prolongation of the direction of conveyance of the nuts, on which said fork is pivotally mounted, and cam means associated with said fork permitting it initially to yield in the said direction only but thereafter to rock to the one or the other side under the eccentric force produced by the engagement of the one side prong with the longer half of the nut.

6. A machine according to claim 5, wherein each of the blades has a sloping operative edge and is mounted with some lateral play and the husk-breaking means further comprises means for moving the said blades automatically into the path of a husk half engaged between one side prong of the fork and the rear part of the respective nut-holding device, whereby the said husk half will be broken across one of the said blades at it continues to be advanced by the said device.

7. A nut-husking machine comprising in combination conveyor means, nut-holding devices mounted on said conveyor means and a husk-cutting arrangement past which the nut-holding devices are carried by the conveyor means, said husk-cutting arrangement comprising a plurality of sets of co-acting opposed rotary cutter discs of small diameter which follow closely on each other, consecutive discs of one set of such cutter discs being arranged to rotate in opposite directions, namely inwardly towards an approaching nut and inwardly towards a receding nut respectively, and a further set of such cutter discs being arranged to reverse their direction of rotation during the cutting of each husk, namely so that the further cutter discs turn inwardly towards a nut entering between them and then inwardly towards the nut passing from between them.

8. A nut-husking machine comprising in combination conveyor means, nut-engaging devices mounted on said conveyor means and a husk-cutting arrangement past which the nut engaging devices are carried by said conveyor means, said husk-cutting arrangement comprising a set of opposed rotary cutter discs including pairs of cutter discs arranged in close succession, one pair on one side of the path of the nuts for engaging one surface of each nut and the other pair on the opposite side of said path for engaging the opposite surface of each nut, said cutter discs being driven so as to turn inwardly on the side towards the approaching nuts and the discs last engaged by receding nuts being driven so as to turn inwardly on the side towards the receding nuts.

9. A nut-husking machine comprising in combination conveyor means, nut-holding devices mounted on said conveyor means and a husk-cutting arrangement past which the nut-holding devices are carried by the conveyor means, said husk-cutting arrangement comprising a set of opposed rotary cutter discs and driving means for the said discs including a drive-reversing device operatively associated with the conveyor means for reversing the disc-drive in synchronism with the conveyor movement, namely so that the said discs turn inwardly towards a nut entering between them and then inwardly towards the nut passing from between them.

10. A nut-husking machine comprising in combination conveyor means, nut-holding devices mounted on said conveyor means, a plurality of co-acting husk-cutting discs past which the nut-holding devices are conveyed by the conveyor means, a three-pronged husk-engaging fork mounted in the path of conveyance of the nuts, a member on which said fork is pivotally mounted and which is slidable in a direction in alignment with the direction of conveyance of the nuts past the cutting discs, cam means operatively engaged with the said member for controlling movement of said fork after its engagement with a nut and shaped to permit the fork to adapt its final position to suit variations in the lengths of individual husks, a blade-like husk-breaking member which is mounted in the path of conveyance of the nuts beyond the said fork and across which one half of said nut is presented by said fork and means in operative engagement with the slidable member and with the conveyor means for retracting the said member automatically after each husk-breaking operation.

11. A nut-husking machine comprising in combination conveyor means, nut-engaging devices mounted on said conveyor means and a husk-cutting arrangement past which the nut-engaging devices are carried by the conveyor means, said husk-cutting arrangement comprising a plurality of sets of rotary cutter discs including pairs of cutter discs of small diameter arranged in close succession, said pairs of cutter discs being arranged on opposite sides of the path of a nut for engaging opposite surfaces of each nut, and driving means for the cutter discs, the cutter discs first engaged by approaching nuts being driven so as to turn inwardly on the side towards the approaching nuts and the discs last engaged by receding nuts being driven so as to turn inwardly on the side towards the receding nuts.

References Cited in the file of this patent

UNITED STATES PATENTS

| | | |
|---|---|---|
| 1,133,121 | Gebhardt | Mar. 23, 1915 |
| 1,510,575 | Anthony et al. | Oct. 7, 1924 |
| 1,645,600 | Kohler | Oct. 18, 1927 |
| 1,921,238 | Milam | Aug. 8, 1933 |
| 2,065,544 | Strong | Dec. 29, 1936 |
| 2,083,968 | Walling | June 15, 1937 |

FOREIGN PATENTS

| | | |
|---|---|---|
| 610,059 | Great Britain | Oct. 11, 1948 |